3,480,506
WOOD LAMINATED WITH A MODIFIED ETHYLENE POLYMER AND A POLYALKYLENE IMINE
Gerald M. Hart, Midland, and Glen L. Gunderman, Clare, Mich., assignors to The Dow Chemical Company, Midland, Mich., a corporation of Delaware
No Drawing. Filed Aug. 20, 1964, Ser. No. 391,036
Int. Cl. B32b 21/08, 27/08, 27/04
U.S. Cl. 161—165
14 Claims

ABSTRACT OF THE DISCLOSURE

Laminated wood structures having improved resistance to delamination, especially in the presence of considerable moisture, are prepared by bonding plies of wood by the use of a combination of a polyalkylenimine adhesion promoter and modified ethylene polymer films. The modified ethylene polymers include graft polymers such as of acrylic acid or methacrylic acid grafted onto polyethylene, interpolymers of ethylene and an $\alpha,\beta$-ethylenically unsaturated carboxylic acid or a monomer having groups which are convertible after polymerization to provide carboxyl groups and ethylene polymers modified by surface activation such as by treatment with corona discharge or high energy electrons, for example as produced by electron accelerators, e.g., Van de Graaff generators, resonant transformers or linear accelerators.

---

This invention relates to an improved adhesive for use in the manufacture of laminated wood articles. More particularly it relates to a method of preparing laminated wood structures having improved resistance to delamination and to the articles obtained thereby.

In the preparation of laminated wood structures, e.g., plywood, a wide variety of adhesives have been and are employed. A number of factors enter into the choice of adhesive, such as cost, ease of application and the like. Of considerable importance is the ultimate use to which the laminated structure is to be put. Thus, for example, an adhesive that might prove quite practical in the preparation of decorative plywood for interior use, where contact with water would not normally be a consideration, would be wholly inadequate for outdoor or marine use. A particular problem relating to laminated structures for use in applications in the presence of considerable moisture is the tendency to delamination.

It is an object of this invention to provide a method for the production of laminated wooden structures which are especially resistant to delamination in the presence of moisture. It is a further object to provide a composition and method for increasing the bond strength of wood laminates. Other and related objects will be evident from the following description and examples of the invention.

According to the present invention, the bonding of plies of wood to form a laminated wooden structure is achieved by the use of a combination of a polyalkylene imine adhesion promoter and modified ethylene polymer films. The polyalkylene imine is applied usually as a solution to the film surfaces or preferably to the wood surfaces to be bonded, the solvent is evaporated, and a panel is assembled by placing a thin sheet or film of the modified polyolefin between plies of the wood. Such an assembled panel is heated at several atmospheres pressure to form the laminated structure.

The modified ethylene polymers include (1) graft copolymers, i.e., polymers obtained by the grafting of carboxyl-containing ethylenically unsaturated monomers such as acrylic acid and methacrylic acid onto preformed ethylene polymers, (2) copolymers of ethylene and an $\alpha,\beta$-ethylenically unsaturated mono- or polycarboxylic acid, or anhydride convertible to carboxylic acid groups by subsequent hydrolysis, and (3) ethylene polymers which are modified by surface activation such as by subjecting a film or thin sheet of the polymer to ionizing radiation, especially high energy electrons such as produced by electron accelerators, e.g., electrostatic generators (Van de Graaff), resonant transformers or linear accelerators, preferably in the presence of oxygen.

The graft copolymers suitable for use as adhesives for the making of plywood according to the invention are graft copolymers of from about 4 to 25, preferably from about 7 to 13, percent by weight of acrylic acid or methacrylic acid and correspondingly from about 96 to 75, preferably from about 93 to 87, percent by weight of polyethylene.

The polyolefin starting material for the grafting reaction can be any normally solid thermoplastic olefin polymer consisting of at least 90 percent by weight of ethylene and not more than 10 percent by weight of another ethylenically unsaturated monomer, such as propylene, butene, vinyl acetate, or styrene, copolymerizable therewith. High density polyethylene is preferred. The polymer starting material is preferably a homopolymer of ethylene having a melt index between about 0.1 and 60. The polymer can be in powder, granular, or shaped form, such as a sheet, film, rod, bars, filaments, fibers or other molded configuration, but is preferably employed in powder or granular form.

The graft copolymers are prepared by reacting acrylic acid or methacrylic acid with polyethylene having active centers on the polymer molecules which active centers are capable of initiating the polymerization of vinyl or vinylidene monomers to form additional polymers. Active centers at which grafting will occur can readily be induced on the polyolefin in known ways, e.g., by subjecting the solid polyolefin to the action of high energy ionizing radiations such as gamma rays, X-rays or high speed electrons, preferably in the presence of air or oxygen for a dose of from 0.5 to 10 megarads in a field of high energy ionizing radiations of an intensity of at least 40,000 rads per hour or the equivalent thereof.

The copolymers, sometimes called interpolymers, of ethylene and an $\alpha,\beta$-ethylenically unsaturated mono- or polycarboxylic acid, or anhydride convertible to carboxylic acid groups by subsequent hydrolysis, generally will contain from about 4 percent to about 25 percent by weight of the acid comonomer in copolymerized form and from about 96 percent to about 75 percent of the copolymerized ethylene component. Specific examples of the acid comonomers are acrylic acid, methacrylic acid, crotonic acid, fumaric acid, maleic acid, itaconic acid, maleicanhydride, monomethyl maleate, ethyl hydrogen maleate, methyl acid fumarate, and monoethyl fumarate. The copolymers are prepared by methods known to the art, for example, by polymerizing mixtures of ethylene, and one or more of the specified acid comonomers at a pressure from about 10,000 to about 35,000 pounds per square inch, or higher, and at a temperature from about 90° C. to about 300° C. in the presence of free-radical catalysts, for example, peroxygen-type catalysts.

Modified ethylene polymers also are prepared for the purposes of this invention by subjecting a film or thin sheet of an ethylene hydrocarbon polymer to irradiation or other known procedures for producing active sites particularly on the surface of the polymer especially in the presence of oxygen or ozone. Especially advantageous for treating the polymers are corona discharge or high energy electrons from the electron accelerator sources such as Van de Graaff accelerators, resonant transformers, and linear accelerators. Irradiation by $\beta$-rays may also be used. By such a treatment active groups are generated on the polymer which, when the treated polymer is used in combination with an adhesion promoter, achieves the objects of this invention. The irradiation dosage range varies somewhat with the type of ethylene polymer being treated. However, the dosage generally will be within the range of from about 0.5 megarad to about 10 megarads. Usually from about 2 megarads to about 6 megarads will give optimum results. Dosages of greater than about 10 megarads produce modified ethylene polymers having poorer adhesive properties when used in the process and product of this invention, probably because of excess crosslinking. Too low a dosage produces an insufficient effect.

When the ethylene polymer is modified by corona discharge treatment of films, any of the known methods and equipment for corona discharge treatment of sheet-like materials may be used. Generally, voltages of between about 3,000 and 15,000 volts are used under conditions such that sparking does not occur. Illustrative equipment is that described in U.S. Patents 3,017,339, 3,081,214, 3,030,290 and in examples subsequently described herein. An ethylene polymer in the form of tubing or flat sheets having a thickness of from about 2 mils to about 10 mils is treated in the above noted or other suitable equipment for a time sufficient to effectively modify the surface of the film. The minimum treatment depends somewhat on the ethylene polymer being treated, i.e. low density polyethylene requires more treatment than high density polyethylene. In general, adequate treatment will be an amount at least equivalent to that obtained by passage at the rate of about 500 feet per minute of a film having a width of 6 inches and a thickness of about 10 mils through the space between electrodes (one of which is a rod ⅜ inch in diameter and of a length about the width of the film and the other is in the form of a flat plate of about the same length and having a width of several times the diameter of the rod), the electrodes being spaced about 60 mils apart, being oriented such that their length dimension is perpendicular to the direction of travel of the film, and having a potential difference of about 10,000 volts. Treatment equivalent to 25 times that amount, or more, may be used if desired, especially with low density polyethylene, i.e. under the above conditions, movement of the film through the space between the electrodes at a rate of 20 feet per minute or less.

The term "modified ethylene polymer," wherever used in these specifications and claims, refers to polymer compositions according to the above description.

The modified ethylene polymers if not prepared as sheet-like compositions can readily be calendered into the form of sheet or film, in which form they are usually employed. Despite the evident advantages of a sheet form adhesive, these modified ethylene polymers may also, of course, be employed in the form of powder or granules, evenly distributed on the surface of the elements to be joined, in amount sufficient to adhesively bond the veneer stock, e.g. sufficient to form a continuous or substantially continuous thin film of said modified ethylene polymer, when heated and pressed.

The polyalkylene imines which are utilized for providing the intermediate adhesion promoting coating deposit in the composite film structures of the invention to secure the desired effective lamination between the wood piles are advantageously one of the polyethylene imines which are of the general structure:

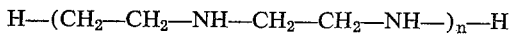

$$H-(CH_2-CH_2-NH-CH_2-CH_2-NH-)_n-H$$

in which $n$ has a numerical value of at least 1 and may be a larger, plural integer having a value as great as 1,000–2,000 and more. Thus, when a polyethylene imine is utilized for treating the surface of the wood or the modified ethylene polymer, it may be of any desired molecular weight in which the material can be obtained. It is generally most advantageous, however, to avoid use of very low molecular weight materials having excessive volatilities.

As is apparent, other polyalkylene imines equivalent to polyethylene imines (obtained by polymerization, in the known way, of the corresponding alkylene imines) may also be utilized as an intermediate adhesion-promoting coat to treat the surfaces of the wood plies or modified ethylene polymer in place of, or in combination with, the polyethylene imines. Ordinarily it is of greatest practical significance for these to include any of the homologous polyalkylene imines which are comprised of alkylene units of less than about 4 carbon atoms. In most cases, although no limiting implications are intended, the polyalkylene imines of greatest interest to employ are the relatively low polymer, water-soluble materials whose viscosity in 20 percent aqueous solution at 20° C. are on the order of 100 poises.

Only a very small quantity of the polyalkylene imine need be deposited as an intermediate adhesive promoting coating on the wood surface to be bonded. In general, an amount equivalent to between about 20 grams and 2500 grams per thousand square feet of double glue line (i.e. per 4000 square feet of interface between wood and polymer) is suitable to facilitate and promote the adhesion of the layers being laminated. Frequently, an amount between about 200 and 750 grams per thousand square feet of double glue line is preferred. Alternatively, the polyalkylene imine may be deposited on the surface of the modified ethylene polymer film.

Although it can be directly applied if desired, the deposition of the polyalkylene imine is generally better and more conventionally and easily accomplished from a solution or dispersion of the adhesion-promoting agent in a suitable solvent, such as water, acetone, methyl ethyl ketone, methyl isopropyl ketone, lower alkyl alcohols (particularly those of less than 4 carbon atoms), etc. Methanol, ethanol and isopropanol are oftentimes found to provide optimum solvent behavior for the polyalkylene imine. Advantageously, a relatively dilute solution of the polyalkylene imine treating agent in the solvent is employed, such as one having a concentration of the polyalkylene imine between about 0.1 and 10 percent, preferably from about 1 to about 2.5 percent, by weight of the dissolved adhesion promoting agent. This solution facilitates the uniform and general deposition over the surface of the substrate of the relatively minute quantities of polyalkylene imine needed for the intermediate adhesion-promoting coating on the substrate prior to assembly of the layers of the polyolefin polymer and the wood being laminated.

The deposition of the polyalkylene imine can be applied from a water solution to the wood substrate with particular advantage.

When the polyalkylene imines (such as polyethylene imine) are employed in too great a concentration on the substrate surface, they tend to result in undesirably weak and unsatisfactory laminated structures.

The coating application of the polyalkylene imine anchor layer may be made by spraying or spread coating the solution thereof on the surface of the wood substrate being laminated to the copolymer layer or vice versa. Necessarily, the coating of the strongly cationic polyalkylene imine agent is dried by air at ambient temperature or by means of heat at an elevated temperature on the surface of the substrate prior to actual assembly of the layers of wood and modified ethylene polymer being laminated.

In this connection, it is sometimes desirable to employ a relatively fugacious solvent in order to allow rapid and ready drying (with minimized or no external application of heat) of the applied polyalkylene imine solution. Thus, isopropanol, ethanol, or methanol are, as has been indicated, beneficial to employ as solvents for the applicating solution of the polyalkylene imine. Such solvents can be easily dried in cool air (such as air at room temperature or with minimum requirements for heat) to deposit the adhesion-promoting intermediate layer of the polyalkylene imine on the surface of the substrate. Frequently, however, the use of warm air is found to be more practical for drying, especially when conditions of relatively high humidity in the atmosphere are encountered.

As employed herein, the term substrate is construed to mean the surface to which the polyalkylene imine material is applied, i.e. the substrate may be wood or a modified ethylene polymer film or sheet.

The thickness of the film of modified ethylene polymer to be employed is, to a large extent, a matter of choice readily arrived at by the skilled worker in the field. A relatively larger amount of the adhesive composition will ordinarily be needed if the surface of the wooden elements is somewhat porous and rough than will be required if such surface is dense and smooth. Accordingly, a somewhat thicker film will be employed in the first case. In general, it will be found that the film thickness may vary from about 2 to 20, preferably from 4 to 10 mils.

Generally, the plies of wood in the assembly are positioned such that the grain of adjacent plies will be in a direction perpendicular to each other, e.g. in a laminate having three plies of wood, the outside layers of the laminate will have the direction of grain parallel whereas the grain of the inside layer will be perpendicular to that of each of the outside layers.

Laminating heat and pressure may be applied immediately after the positioning of the polymer sheet between the wood elements to be bonded. Alternatively, the wood elements and the film-form adhesive may be assembled and set aside for as long a period as may be desired before the bonding operation is carried out.

In order that bond formation take place, it is necessary that the polymer be heated to a temperature sufficiently high that it will flow readily upon the application of the pressure necessary to effect intimate contact between the meeting faces of the wood plies to be joined. In general, a temperature within the range of about 100° C. to about 250° C. will be effective to cause softening of the copolymer and form a good bond while subjecting the assembly to a pressure of about 20 to 500, preferably 25 to 200, pounds per square inch gauge pressure.

The duration of the time of application of heat and pressure will depend principally on the thickness of the assembly being laminated inasmuch as this thickness determines the time required for the heat to penetrate to the polymer portion furthest removed from the heated platens of the laminating press. A laminating time of from about 2 to 5 minutes will be found sufficient, for example, in producing a 3-ply laminate from veneer 1/16 inch in thickness. Thicker laminates will require proportionally large cycles and laminating times of 30 minutes, or longer, may be used.

Cooling of the laminated assembly under pressure, while not necessary for the achieving of adequate bond strength, is sometimes desirable to prevent warping that may result on cooling, particularly in the case of relatively thin laminates of considerable area. This may be accomplished in the laminating press, simply by shutting off the flow of steam to the platens and admitting cooling water thereto. However, in the interest of both heat economy and of time consumption, it is preferred to transfer the hot laminated assembly to a cold press where it is immediately subjected to substantially the same pressure employed during heating. It is maintained at that pressure until the assembly has cooled to approximately ambient temperature.

The bond between the wood plies of a laminated structure produced according to the present invention is extremely strong and highly resistant to the action of moisture. The laminates are adapted to outdoor applications and are useful under conditions of exposure to moisture and water.

The following examples are given to illustrate more fully, to those skilled in the art, the practice of the invention but are not intended as limiting the scope thereof. In the examples all parts and percentages are by weight unless otherwise indicated.

EXAMPLES 1–13

A number of three-ply laminates of wood veneer stock measuring 1/16 inch in thickness (except as indicated below) were prepared using as the adhesive graft copolymers of acrylic acid and high density polyethylene with conjoint application of polyethylene imine. The polyethylene imine was applied to the veneer by brushing an aqueous solution having a concentration of 1 percent by weight to the veneer surfaces to be bonded. Such treatment resulted in a coating of polyethylene imine of 243 grams, dry basis, per 1000 square feet of double glue line for birch veneer and correspondingly 312 grams when Douglas fir was used. After the treated veneer stock had air-dried for 16 hours at ambient temperature, a three-ply panel was assembled such that the direction of the grain of the center ply was perpendicular to the grain direction of the outside plies and with a thin sheet of a graft polymer acrylic acid and high density polyethylene between the plies of veneer stock and in contact with the polyethylene imine-treated surface thereof.

The assembled panels were laminated by being placed in a steam-heated hot press for 5 minutes at 185° C. and a pressure of 200 p.s.i. (except as indicated below) then immediately thereafter in a cold press where they were subjected to a pressure of 200 p.s.i. for 2 minutes. Samples of the 3-ply laminate were prepared and tested by a procedure similar to that described in ASTM D805–52, Plywood Glue Test. The measurements of shear strength were taken on samples of the laminate as fabricated, in a dry shear measurement, and also while still wet after a "cyclic boil test." Results of the measurement as shown are the average for 5 samples.

The cyclic boil test consisted of immersing test pieces of the laminate in boiling water for 4 hours, then removing and drying the test pieces in an oven for 20 hours at 60° C., then immersing in boiling water for an additional 4 hours, after which the test pieces are placed in cold water and allowed to cool. The samples from the cyclic boil test also were observed for delamination.

An identification of the graft copolymers used, kind of veneer employed and test results of the finished laminates are shown in Table I. There are shown also in Table I data for laminates prepared by the method of the examples but without the full combination of this invention, i.e. without the treatment with a polyalkylene imine. Such laminates having no polyalkylene imine treatment are not examples of the invention but are included for comparative purposes.

TABLE I

| No. | Acrylic Acid Content Percent by Weight [a] | Film Thickness, mils | Type Veneer [b] | Veneer Treatment [c] | Deviation in hot press conditions [d] | Dry Average Shear, p.s.i. | Dry Wood Failure, Percent | Cyclic Boil Test Average Shear, p.s.i. | Cyclic Boil Test Wood Failure, Percent | Delamination, Percent |
|---|---|---|---|---|---|---|---|---|---|---|
| 1 | 8.0 | 1.2 | Birch | PEI | | 594 | 7 | 515 | 87 | 0 |
| 2* | 8.5 | 8 | do | None | | 824 | 13 | 121 | 3 | 70 |
| 3 | 8.5 | 8 | do | PEI | | 924 | 98 | 507 | 89 | 0 |
| 4* | 9.4 | 3.2 | do | None | | 761 | 14 | | | 100 |
| 5 | 9.4 | 3.2 | do | PEI | | >1,000 | | 429 | 90 | 0 |
| 6 | 9.4 | 1.6 | do | PEI | 23 sec | 788 | 100 | 445 | 72 | 0 |
| 7 | 9.4 | 1.7 | do | PEI | 20 sec. at 220° C | 915 | 62 | 533 | 54 | 0 |
| 8* | None | 5.8 | do | PEI | | 714 | 20 | | | 100 |
| 9* | 9.4 | 1.6 | Fir (⅛") | None | | 251 | 99 | | | 100 |
| 10 | 9.4 | 1.5 | do | PEI | | 278 | 100 | 184 | 97 | 0 |
| 11 | 9.4 | 2.7 | do | PEI | 3 min | 295 | 99 | 215 | 88 | 0 |
| 12* | 9.4 | 2.7 | Red gum | None | | 528 | 93 | | | 100 |
| 13 | 9.4 | 2.7 | do | PEI | | 556 | 83 | 354 | 98 | 0 |

*Not an example of this invention.
[a] Grafted on high density polyethylene.
[b] 1/16" thick, except as indicated; fir was Douglas fir.
[c] PEI, indicates treatment with a one-percent aqueous solution of polyethylene imine.
[d] Regular conditions 5 min., 185° C., 200 p.s.i.

Similar advantageous results are obtained when methacrylic acid is substituted for the acrylic acid used in the above examples of the invention. Likewise, similar advantageous results are obtained when another polyalkylene imine such as polypropylene imine, polybutylene imine is substituted for the polyethylene imine in the above examples.

EXAMPLE 14

A laminate was prepared by the method and with the material of Example 1 except that a film (8.1 mils in thickness) prepared from a copolymer (interpolymer) obtained by conjoint high pressure polymerization of ethylene and acrylic acid, containing 10 percent by weight of the acrylic acid component, was substituted for the graft copolymer of acrylic acid and high density polyethylene. The average dry shear of the laminate obtained thereby was 961 p.s.i. with the percent wood failure being 100. The cyclic boil test results were average shear, 454 p.s.i.; wood failure, 69%; and delamination, none.

For comparative purposes another laminate (not an example of this invention) was prepared by an identical procedure as in the above example of the invention except the polyethylene imine treatment of the veneer surface was omitted. Samples of the laminate thus obtained gave the following results when tested in the same manner as in the example.

Dry test:
  Average shear, p.s.i. _____ 820
  Wood failure, percent _____ 31
Cyclic boil test:
  Average shear, p.s.i. _____ ---
  Wood failure, percent _____ ---
  Delamination, percent _____ 100

Substantially the same results are obtained when there are substituted for the copolymer of ethylene and acrylic acid of Example 14 other α-olefin copolymers having pendant carboxyl groups or groups convertible to carboxyl groups such as are obtained, for example, by the copolymerization of ethylene with other α,β-ethylenically unsaturated carboxylic acids or anhydrides such as methacrylic acid, maleic acid, fumaric acid, itaconic acid, maleic anhydride, and maleic half esters with alcohols having from 1 to 4 carbon atoms, e.g. methyl acid maleate, ethyl hydrogen maleate, and isobutyl hydrogen maleate.

EXAMPLES 15–22

Other laminates were prepared by the method of Example 1, except that for the graft copolymer there was substituted polyethylene which had been subjected to a corona discharge treatment. The laminates also were tested in the same manner as in Example 1 and the results are shown in Table II. Included also in Table II are results, for comparative purposes, of laminates which were prepared in the same manner except that they lack the full combination of the invention, i.e. either the ethylene polymer was not modified according to the concept of the invention or the treatment with a polyalkylene imine was omitted. While such laminates have been given an example number in Table II, they are identified by an asterisk (*) as well as descriptive language to indicate that they are not examples of the invention. The corona discharge treatment was carried out in accordance with the following description: The corona discharge apparatus comprised a transformer having a 110-volt primary and a 10,000-volt secondary producing an output current of 23 milliamperes. That output was connected to a 6-inch by 12-inch stainless steel plate and to a moveable rod, ⅝-inch in diameter and 7 inches long, suspended about 1/16 inch above the plate. The polyethylene films being treated were held stationary in the space between the steel plate and the moveable rod, while the rod was moved mechanically back and forth across the film. The moveable bar was controlled so that it traveled 11 inches in about 7.5 seconds (one pass) while the 1/16-inch gap was maintained. The kind of polyethylene, i.e. high or low density, and the treatment in terms of the number of passes are listed in Table II with the corresponding test results.

TABLE II

| No. | Polymer Description [a] | Film Thickness, mils | Corona Discharge Treatment No. of passes | Veneer Treatment [b] | Dry Average Shear, p.s.i. | Dry Wood Failure, percent | Cyclic Boil Test Average Shear, p.s.i. | Cyclic Boil Test Wood Failure, percent | Delamination, percent |
|---|---|---|---|---|---|---|---|---|---|
| 15* | HDPE | 7.0 | 5 | None | 744 | 18 | | | 100 |
| 16* | HDPE | 6.0 | None | PEI | 878 | 8 | | | 100 |
| 17 | HDPE | 5.1 | 1 | PEI | >1,000 | | 578 | 56 | 0 |
| 18* | LDPE | 6.2 | None | PEI | 425 | 0 | 107 | 0 | 20 |
| 19 | LDPE | 6.2 | 8 | PEI | 673 | 43 | 280 | 38 | 0 |
| 20 | LDPE | 6.2 | 16 | PEI | 645 | 96 | 389 | 74 | 0 |
| 21 | LDPE | 6.2 | 24 | PEI | 842 | 96 | 603 | 65 | 0 |
| 22* | LDPE | 9.8 | 5 | None | 592 | 6 | 277 | 3 | 0 |

* Not an example of this invention.
[a] HDPE = High density polyethylene.
  LDPE = Low density polyethylene.
[b] PEI, treatment with one percent aqueous solution of polyethylene imine.

EXAMPLES 23-30

Other laminates were prepared and tested as described for Example 1 except that for the ethylene graft copolymer there was substituted polyethylene which had been subjected to irradiation by use of a Van de Graaff generator. Pertinent data and test results are shown in Table III together with comparative data for laminates— with an asterisk (*)—which are not examples of the invention because they do not contain the full combination of the invention.

TABLE III

| No. | Polymer [a] Description | Film Thickness, mils | Irradiation [c] Dosage, megarads | Veneer [b] Treatment | Dry | | Cyclic Boil Test | | Delamination, percent |
|---|---|---|---|---|---|---|---|---|---|
| | | | | | Average Shear, p.s.i. | Wood Failure, percent | Average Shear, p.s.i. | Wood Failure, percent | |
| 8* | HDPE | 5.8 | None | PEI | 714 | 20 | | | 100 |
| 23 | HDPE | 5.9 | 2 | PEI | 916 | 99 | 555 | 65 | 0 |
| 24 | HDPE | 4.6 | 4 | PEI | 983 | 50 | 426 | 46 | 0 |
| 25 | HDPE | 5.5 | 6 | PEI | 885 | 91 | 416 | 53 | 0 |
| 26 | LDPE | 6.2 | 2 | PEI | 814 | 95 | 427 | 96 | 0 |
| 27 | LDPE | 6.2 | 4 | PEI | 710 | 93 | 460 | 70 | 0 |
| 28 | LDPE | 6.2 | 6 | PEI | 768 | 88 | 477 | 96 | 0 |
| 29 | LDPE | 6.2 | 10 | PEI | 831 | 98 | 499 | 87 | 0 |
| 30 | LDPE | 6.2 | 20 | PEI | 813 | 96 | 471 | 57 | 0 |

* Not an example of this invention.
[a] HDPE=high density polyethylene.
 LDPE=low density polyethylene.
[b] PEI, treatment with one percent aqueous solution of polyethylene imine.
[c] By van de Graaff Generator.

From the above examples, it can be seen that the full combination of this invention, i.e. the modified ethylene polymer and the polyalkylene imine adhesion promoter, is required to obtain the advantages of this invention. Particularly noteworthy are the results with red gum veneers which are especially difficult to laminate effectively with the ordinary adhesives and methods of the prior art.

What is claimed is:

1. A laminated wood article of manufacture which is highly resistant to delamination in the presence of moisture comprising a laminate of a plurality of wood plies adhesively joined in face abutting contact by an adhesive material consisting essentially of an amount within the range of that corresponding to a film of from about 2 to about 20 mils thick of a modified ethylene polymer and in combination therewith a polyalkylene imine on the surface of at least one of the wood and the modified ethylene polymer for each wood-polymer interface in an amount equivalent to from about 20 grams to about 2500 grams per one thousand square feet of double glue line; said modified ethylene polymer being selected from the group consisting of (1) polymers obtained by the grafting of carboxyl-containing ethylenically unsaturated monomers onto preformed normally solid thermoplastic olefin polymers containing at least 90 percent by weight of ethylene; (2) interploymers of copolymerized ethylene and an a,β-ethylenically unsaturated carboxylic acid or an a,β-ethylenically unsaturated anhydride convertible by subsequent hydrolysis to provide carboxylic groups; (3) an ethylene polymer which has been irradiated with high energy electrons; (4) an ethylene polymer which has been modified by corona discharge treatment.

2. The article of claim 1 in which the polyalkylene imine is ethylene imine.

3. The article of claim 1 in which the ethylenic polymer is a graft copolymer of polyethylene and a monomer selected from the group consisting of acrylic acid and methacrylic acid.

4. The article of claim 1 in which the modified ethylene polymer is an interpolymer of from about 96 percent to about 75 percent of ethylene and from about 4 percent to about 25 percent of an a,β-ethylenically unsaturated carboxylic acid, said percentages being based on the total weight of the interpolymer.

5. The article of claim 1 in which the modified ethylene polymer is an ethylene polymer film which has been subjected to corona discharge.

6. The article of claim 1 in which the modified ethylene polymer is an ethylene polymer which has been irradiated with high energy electrons to a dose of from about 0.5 megarad to about 10 megarads.

7. A method for preparing laminated wood articles which are highly resistant to delamination in the presence of moisture comprising
(a) positioning between wood surfaces to be joined an adhesive amount within the range of that corresponding to a film of from about 2 to about 20 mils thick of a modified ethylene polymer and an effective adhesion promoting amount of a polyalkylene imine which had been applied previously to a surface of at least one of the wood and the modified ethylene polymer for each wood-polymer interface
(b) heating the resulting assembly at temperatures between about 100 and 250° C. under pressures of from about 20 to about 500 pounds per square inch gauge; said modified ethylene polymer being selected from the group consisting of (1) polymers obtained by the grafting of carboxyl-containing ethylenically unsaturated monomers onto preformed normally solid thermoplastic olefin polymers containing at least 90 percent by weight of ethylene; (2) interpolymers of copolymerized ethylene and an a,β-ethylenically unsaturated carboxylic acid or an a,β-ethylenically unsaturated anhydride convertible by subsequent hydrolysis to provide carboxylic groups; (3) an ethylene polymer which has been irradiated with high energy electrons; (4) an ethylene polymer which has been modified by corona discharge treatment.

8. The method of claim 7 in which the polyalkylene imine is ethylene imine.

9. The method of claim 7 in which the amount of the polyalkylene imine is equivalent to from about 20 to about 2500 grams per one thousand square feet of double glue line.

10. The method of claim 7 in which the amount of the polyalkylene imine is equivalent to from about 200 to about 750 grams per one thousand square feet of double glue line.

11. The method of claim 7 in which the modified ethylene polymer is a graft copolymer of polyethylene and a monomer selected from the group consisting of acrylic acid and methacrylic acid.

12. The method of claim 7 in which the modified ethylene polymer is an interpolymer of from about 96 percent to about 75 percent of ethylene and from about 4 percent to about 25 percent of an a,β-ethylenically unsaturated carboxylic acid, said percentages being based on the total weight of the interpolymer.

13. The method of claim 7 in which the modified ethylene polymer is an ethylene polymer which has been irradiated with high energy electrons to a total dose of from about 0.5 megarad to about 10 megarads.

14. The method of claim 7 in which the modified ethylene polymer is an ethylene polymer which has been subjected to corona discharge.

References Cited

UNITED STATES PATENTS

| | | | |
|---|---|---|---|
| 2,997,170 | 8/1961 | Lowry et al. | |
| 3,198,692 | 8/1965 | Bridgeford | 161—188 |
| 3,230,135 | 1/1966 | Hurst | 161—250 |
| 2,828,237 | 3/1958 | Rosser | 161—228 |
| 2,910,723 | 11/1959 | Traver | 204—168 |
| 2,935,418 | 5/1960 | Berthold et al. | |
| 2,952,578 | 9/1960 | Carlson. | |
| 3,033,707 | 5/1962 | Lacy et al | 156—244 |
| 3,146,146 | 8/1964 | Anderson. | |
| 3,234,197 | 2/1966 | Baum | 161—250 X |
| 3,371,002 | 2/1968 | Reddeman | 156—244 |

ROBERT F. BURNETT, Primary Examiner

R. H. CRISS, Assistant Examiner

U.S. Cl. X.R.

156—272, 313, 331, 334; 161—251, 254, 270, 412